March 17, 1970    H. D. DAIGH    3,500,807
EXHAUST RECYCLE SYSTEM
Filed March 4, 1968    2 Sheets-Sheet 1

INVENTOR.
HAROLD D. DAIGH
BY Donald W Canady
ATTORNEYS.

3,500,807
EXHAUST RECYCLE SYSTEM
Harold D. Daigh, Rolling Hills Estates, Calif., assignor to Atlantic Richfield Company, Philadelphia, Pa., a corporation of Pennsylvania
Continuation-in-part of application Ser. No. 561,959, June 30, 1966. This application Mar. 4, 1968, Ser. No. 710,365
Int. Cl. F02m 25/06, 31/08; F01n 1/14
U.S. Cl. 123—119
22 Claims

ABSTRACT OF THE DISCLOSURE

This application describes an internal combustion engine with an exhaust recycle system and means for injecting air into the exhaust gas. Means are provided for prevention of air injection into that portion of exhaust gas which is recycled into the induction system.

---

This application is a continuation-in-part application of my application S.N. 561,959, filed June 30, 1966, abandoned.

This invention relates to an improvement in the control of emissions from internal combustion engines and, more particularly, relates to an internal combustion exhaust system wherein air is injected into the exhaust manifold to reduce hydrocarbon and carbon monoxide emissions and a portion of the exhaust gas is recycled into the induction system.

Recent air pollution control legislation has been aimed primarily at the reduction of hydrocarbon and carbon monoxide emissions, although it is becoming apparent that nitrogen oxides as well as hydrocarbon and carbon monoxide are precursors of air pollution eye irritants. In fact, some studies show that reduction of hydrocarbons without concomitant reduction of nitrogen oxides actually results in an increase in production of eye irritants. Consequently, it is believed desirable to reduce both hydrocarbon and carbon monoxide emissions and also nitrogen oxide emissions in order to effect a beneficial reduction of atmospheric eye irritants.

The conventional exhaust manifold air injection means designed to reduce the hydrocarbon and carbon monoxide emissions into the atmosphere do not reduce all objectional automobile emissions, particularly nitrogen oxide emissions. In my Patent No. 3,237,615, issued Mar. 1, 1966, an exhaust recycle system is described for reducing nitrogen oxide emissions from internal combustion engines by recycling a portion of the exhaust gas into the induction manifold downstream from the carburetor. Efforts to combine the air injection systems with the exhaust recycle systems to remove both hydrocarbon and nitrogen oxide emissions, have been unsuccessful since they result in the recycling of air into the induction system which tends to increase the oxidation rate and effectively nullifies the reduction of total nitrogen oxide emissions effected by exhaust recycle.

Accordingly, it is a prime object of my present invention to combine an exhaust system designed to reduce nitrogen oxides, with an exhaust system modified to reduce hydrocarbon and carbon monoxide emissions.

It is also a prime object of my present invention to provide an exhaust recycle system modified to effect a reduction of carbon monoxide and hydrocarbon emissions.

It is also an object of my present invention to provide with an exhaust manifold air oxidation system, an appropriate means for reducing nitrogen oxide emissions.

Other objects and a fuller understanding of my present invention may be had by reference to the following specification and the appended claims when taken in conjunction with the accompanying drawings, in which:

Figure 1:
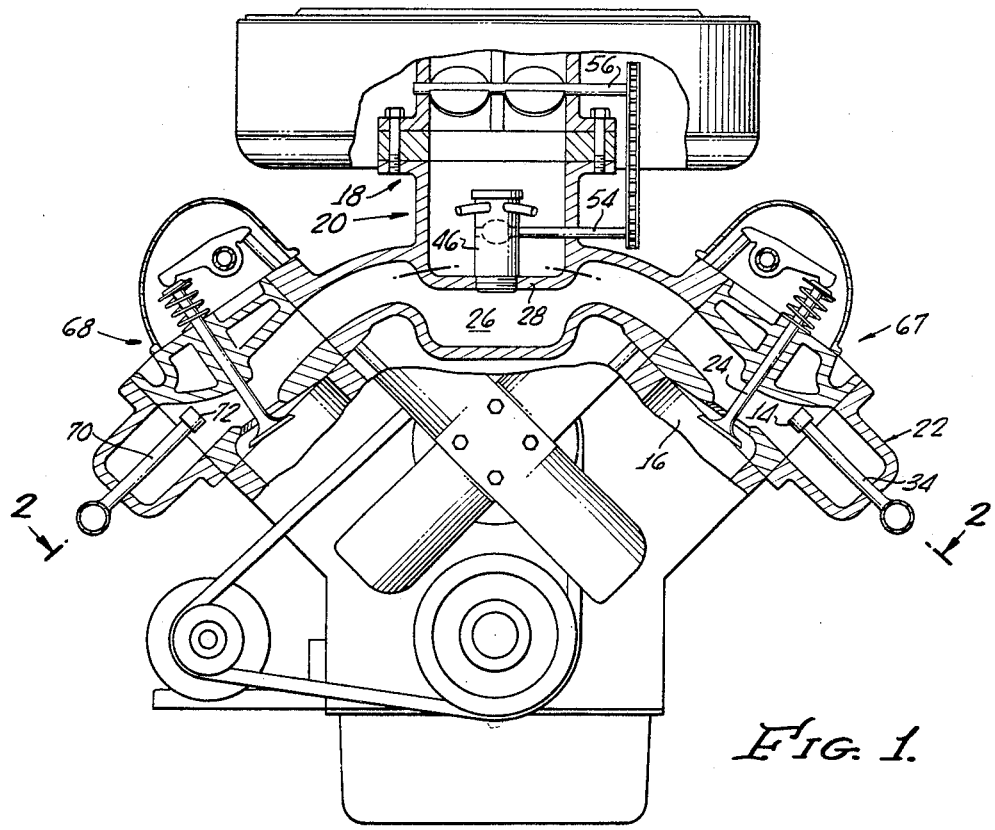
FIG. 1 is a front elevation, partly in section, of an internal combustion engine showing exhaust manifold air injection tubes and the path of exhaust gases through the heat riser.
Figures 4, 5:
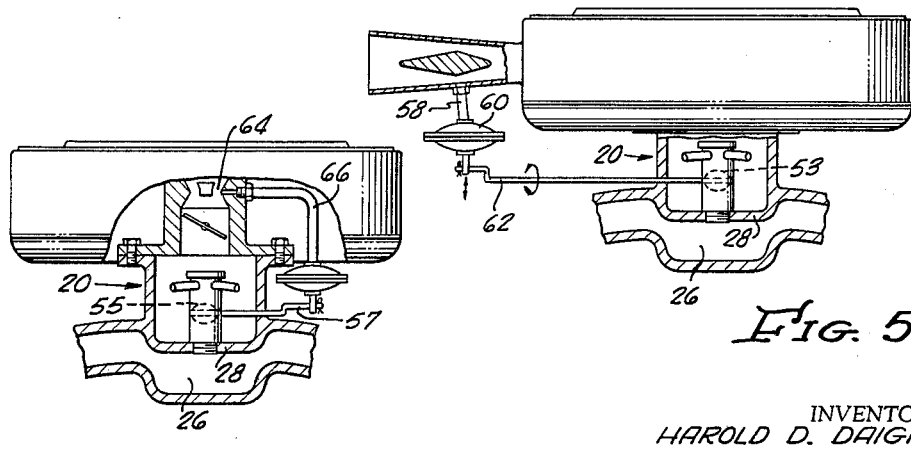
FIG. 4 shows a modification of the control valve apparatus shown in FIG. 1 whereby the carburetor venturi vacuum is utilized to operate the recycle control valve.
FIG. 5 shows another modification of the apparatus shown in FIG. 1 wherein the carburetor air flow vacuum is utilized to automatically operate the recycle control valve.

Briefly described, my present invention provides a means for rendering an exhaust manifold air injection system compatible with an exhaust recycle system wherein a portion of the exhaust gas is recycled into the induction manifold by plugging or removing the air injection tubes which furnish air to the exhaust gas which is recycled, for example, to those exhaust ports supplying exhaust gas to the heat riser. A cross section of the exhaust manifold 22 showing the flow of recycle gases through the heat riser 26 in a V–8 internal combustion engine, is shown in FIG. 1. Air injection tubes 34 and 70, which are two of the eight tubes provided in accordance with a conventional exhaust manifold air injection system, are plugged or restricted with plugs 14 and 72. Only the air injection tubes 34 and 70, which furnish air to the exhaust ports supplying air to the heat riser 26, are plugged. The recycle valve 46 may be operated conjointly with the carburetor throttle through the accelerator mechanism, as shown in FIG. 1, or alternatively, may be vacuum operated as shown in FIGS. 4 and 5.

In my aforementioned patent on an "Exhaust Recycle System," several means are described for controlling the exhaust recycle valve that controls the flow of exhaust recycled into the induction system, and an arrangement conjointly operating the recycle valve with the throttle valve accelerator mechanism is shown whereby the exhaust recycle valve is open at part-throttle positions of the accelerator mechanism which correspond to the cruising speeds of an automobile, and the recycle valve is substantially closed at idle and floorboard accelerator mechanism positions. Exhaust recycle at idle tends to cause rough idle, and recycle at floorboard position tends to prevent development of maximum power which is sought at floorboard position. Although the foregoing recycle valve control arrangement is the preferred system, the present invention relating to a combination of an exhaust system with an exhaust manifold air injection system, is also useful with other recycle valve control arrangements.

Referring now more particularly to the drawings, FIG. 1 shows a cross section through a conventional V–8 internal combustion engine having a combustion chamber 16, a carburetor 18 and an induction system 20, the engine being modified to include an exhaust recycle system and a manifold air injection system. Exhaust gas is discharged from the combustion chamber 16 into the exhaust manifold 22 when the exhaust valve 24 is open during the exhaust cycle of the internal combustion engine operation. Exhaust gas from one or more of the exhaust ports is conventionally passed through a heat riser 26 and preheats or vaporizes the air-fuel mixture passing through the induction system into the intake manifold by heat exchange through hot plate 28. The exhaust manifold 22 is provided with a butterfly valve 30, as best viewed in FIG. 2, to create a slight pressure imbalance between the two cylinder banks of the V-8 engine shown, in order to draw some exhaust gas from one side of the exhaust manifold to the other through the heat riser. The valve 30 is commonly called the heat riser valve.

The conventional exhaust manifold air injection system injects air under pressure into the exhaust manifold through tubes 32, 34, 36, and 38 which receive air from an air compressor (not shown) through pipe 42 from manifold pipe 40. Air injector tubes 34 and 70 supply air to the exhaust manifold port 44 which in turn provides exhaust gas to the heat riser 26. Since a portion of the exhaust gas passing through the heat riser is recycled into the induction system, for the purpose of reducing nitrogen oxides, it has been found desirable to eliminate or reduce air injection into this exhaust port to avoid interference with the nitrogen oxide reduction effected by the exhaust recycle program. Air injection into the exhaust ports 44 and 45 can be eliminated by either plugging the air injector tubes 34 and 70 with plugs 14 and 72 or by removing the tubes 34 and 70 altogether, and, of cousre, covering the air manifold pipe 40 openings left when the air injection tubes are removed.

The exhaust recycle withdrawn from the heat riser aids in the flow of exhaust through the heat riser, and, consequently, the pressure imbalance effected by the heat riser valve 30 is not necessary. It has been found desirable to block the valve 30 open in order to draw exhaust gas through the heat riser and into the recycle conduit equally from both cylinder banks. It is felt that the pressure imbalance created by closing the heat riser valve 30 would tend to draw oxygen into the heat riser, which is believed objectionable from the nitrogen oxide reduction standpoint.

In the apparatus shown in FIG. 1, exhaust gas from the heat riser is recycled through the recycle member 46 and out into the induction manifold through tubes 48 and 50, which each supply recycle gas to two intake ports. The recycle control valve 52, shown as a butterfly valve, is rotated on a shaft 54 which is driven through a chain connection by throttle valve shaft 56 or by one of the other recycle control systems shown or described in my aforementioned Patent No. 3,237,615.

The recycle control valve may be operated automatically by pulling a vacuum off the carburetor air flow through line 58, as shown in FIG. 5, and connecting this to a diaphragm member 60. The other side of the diaphragm is connected through mechanical linkage 62 to the recycle valve 53 to effect automatic vacuum control. In FIG. 4 the vacuum source is the carburetor venturi 64 and the vacuum is pulled through line 66 to diaphragm mechanism 51 and recycle valve 55 operated through mechanical linkage 57.

The apparatus used on the other cylinder bank 68 of the V-8 engine, is substantially identical to the apparatus for the right bank 67. The air injection tube 70, which provides air to the exhaust port supplying exhaust to the heat riser, is plugged with plug 72. The exhaust gas from each bank passes through its separate exhaust manifold and into an exhaust pipe.

Figure 2:
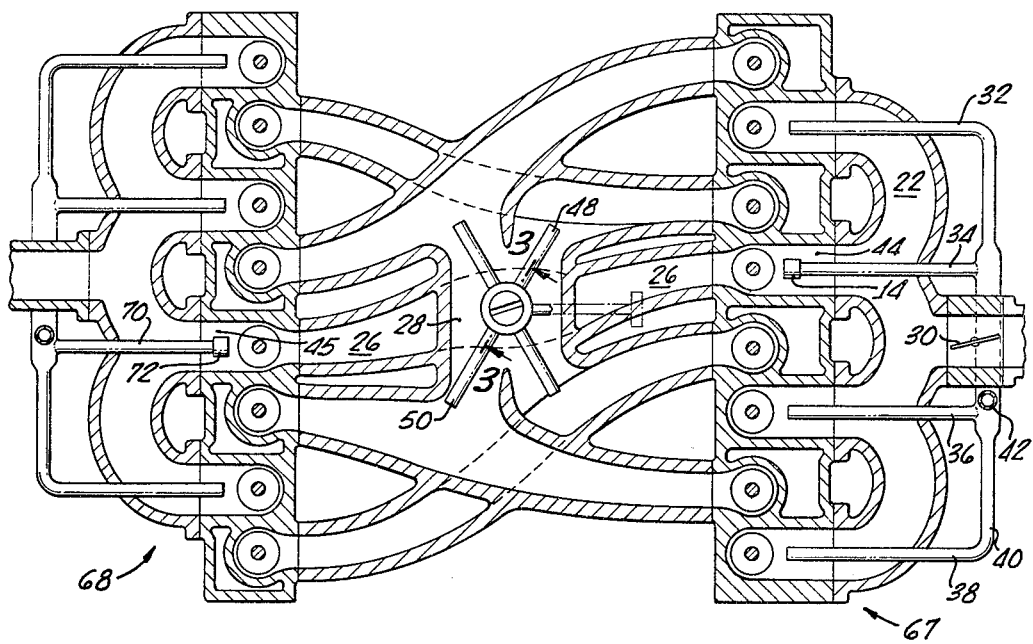
FIG. 2 is a plan view, partially in section, taken on line 2—2 of FIG. 1, showing the exhaust manifold and the position of the exhaust outlets from which exhaust gas is passed through the heat riser.
Figure 3:
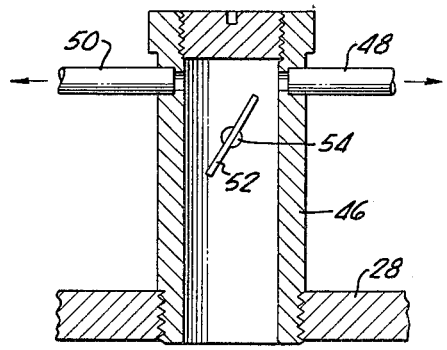
FIG. 3 shows in partial section, an enlarged view taken on line 3—3 of FIG. 2, showing an exhaust recycle control valve.

As an example of the effectiveness of my present invention, a 1966 Chevrolet having a 283 C.I.D. V-8 engine equipped with exhaust recycle and exhaust manifold air injection systems, as shown in FIGS. 1 and 2, was tested on a chassis dynamometer. The data obtained on these tests is tabulated in Table I.

TABLE I

| | Run Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Odometer | 2,443 | 2,500 | 2,515 | 2,538 | 2,556 | 2,565 | 2,580 | 2,590 | 2,599 | 2,605 | 2,669 | 2,670 | 2,672 | 2,624 |
| Exhaust manifold air injection pump | On | On | On | Off | Off | Off | On[1] | On[1] | On[1] | On[1] | On[1] | On[1] | On[1] | On[1] |
| Manifold vacuum | 17.5 | 16.0 | 14.4 | 18.7 | 16.4 | 13.8 | 18.5 | 15.0 | 14.0 | 14.5 | 6.5 | 6.7 | 9.4 | 15.4 |
| Ignition vacuum | 18.2 | 16.5 | 15.0 | 19.4 | 17.0 | 14.0 | 19.0 | 15.5 | 14.4 | 15.0 | 7.0 | 7.1 | 9.5 | 16.0 |
| Car, m.p.h. | 51 | 51 | 51 | 51 | 51 | 51 | 51 | 51 | 51 | 51 | 16 | 31 | 46 | 52 |
| Dyno., m.p.h. | 50 | 50 | 50 | 50 | 50 | 50 | 50 | 50 | 50 | 50 | 15 | 30 | 45 | 50 |
| Fuel flow, p.p.h. | 14.85 | 14.4 | 16.1 | 14.5 | 14.8 | 15.7 | 15.2 | 15.3 | 15.6 | 15.2 | 10.1 | 11.6 | 21.1 | 15.4 |
| Ignition basic timing | 4° | 4° | 4° | 4° | 4° | 4° | 4° | 4° | 4° | 4° | 4° | 4° | 4° | 4° |
| R.p.m. | 2,080 | 2,090 | 2,080 | 2,070 | 2,070 | 2,080 | 2,090 | 2,070 | 2,080 | 2,080 | 1,480 | 1,520 | 1,990 | 2,090 |
| Exhaust heat riser valve | Open | Open | Open | Open | Open | Open | Open | Open | Open | Open | Open | Open | Open | Open |
| Recycle open | None | 30° | 45° | None | 30° | 80° | None | Normal[3] | 80° | 45° | Normal | Normal | Normal | Normal |
| Exhaust "HG"[2] | 1.3 | 1.3 | 1.3 | 1.3 | 1.3 | 1.3 | 1.3 | 1.3 | 1.3 | 1.3 | 1.2 | 1.3 | 1.9 | 1.1 |
| Temperatures, °F.: | | | | | | | | | | | | | | |
| Intake manifold | 82 | 130 | 186 | 90 | 144 | 227 | 88 | 179 | 221 | 185 | | | | |
| Ambient | 68 | 71 | 72 | 74 | 74 | 74 | 75 | 74 | 74 | 73 | 78 | 78 | 78 | 80 |
| Spark plug | 690 | 570 | 490 | 675 | 580 | 465 | 665 | 530 | 1,180 | 510 | 380 | 475 | 540 | 540 |
| Carburetor jet | 56 | 56 | 56 | 56 | 56 | 56 | 56 | 56 | 56 | 56 | 56 | 56 | 56 | 56 |
| Carburetor No. | 103 | 103 | 103 | 103 | 103 | 103 | 103 | 103 | 103 | 103 | 103 | 103 | 103 | 103 |
| Nitrogen oxides, p.p.m[4] | 965 | 440 | 384 | 1,207 | 318 | 206 | 834 | 195 | 173 | 180 | 499 | 413 | 476 | 244 |
| Hydrocarbons, p.p.m. by F.I.D | | | | | | | | | | | [5]247 | [5]247 | [5]247 | 20 |

[1] Blocked air injection port on each side adjacent exhaust outlet feeding heat riser.
[2] Exhaust back pressure.
[3] About 30° when connected to accelerator pedal for automatic control.
[4] Uncorrected for amount of air in exhaust.
[5] Composite acceleration, hydrocarbons on decelerations were about 293 p.p.m.

The analytical data showing nitrogen oxide content was not corrected to take into consideration the amount of exhaust dilution caused by the air injected in the exhaust. In runs 1, 4 and 7 there was no exhaust recycle, and hence the nitrogen oxide content was relatively high, i.e., 965, 1207, and 834 parts per million, respectively. In runs 2 and 3 the recycle valve was open to varying extents. The analytical results show that the nitrogen oxide content of the exhaust gas was substantially reduced by exhaust recycle. It can also be seen from these data that the use of exhaust manifold air injection substantially increases the nitrogen oxide emission (runs 2 and 3) unless the air injection ports leading to the heat riser are blocked (runs 7–10 and 14). Runs 11–13 show that the nitrogen oxide emissions increase during acceleration.

I claim:
1. In an exhaust system for an internal combustion engine having combustion chambers and valved exhaust outlets leading therefrom into an exhaust manifold, an induction system including a carburetor for feeding an air-fuel mixture to said combustion chambers, the improvement comprising, in combination:
  (a) means for recycling a portion of the exhaust gas from said combustion chambers into said induction system,
  (b) means for injecting air into the exhaust gas passing through said exhaust outlet and into said exhaust manifold, and
  (c) means for substantially preventing said air injection into said portion of exhaust gas which is recycled into said induction system to thereby effectively prevent said injected air from commingling with that portion of said exhaust gas recycled into said induction system.

2. The apparatus of claim 1 wherein said recycle means are arranged to recycle said exhaust gas into said induction system downstream from said carburetor.

3. The apparatus of claim 1 wherein said induction system includes an induction manifold between said carburetor and said combustion chambers and said recycle means are arranged to recycle said exhaust gas into said induction manifold.

4. In an exhaust system for an internal combustion engine having combustion chambers and valved exhaust outlets leading therefrom into an exhaust manifold, an induction system including a carburetor for feeding an air-fuel mixture to said combustion chambers, the improvement comprising, in combination:
 (a) means for recycling a portion of the exhaust gas from said combustion chambers into said induction system,
 (b) a plurality of conduit means for injecting air into the exhaust gas passing through said exhaust outlets and into said exhaust manifold, and
 (c) means for plugging each said conduit means which would inject air into that portion of exhaust gas which is recycled to thereby effectively prevent said injected air from commingling with that portion of said exhaust gas recycled into said induction system.

5. In an exhaust system for an internal combustion engine having combustion chambers and valved exhaust outlets leading therefrom into an exhaust manifold with the exhaust gas from at least one of said outlets passing through a heat riser, an induction system including a carburetor for feeding an air-fuel mixture to said combustion chambers, the improvement comprising, in combination:
 (a) means for recycling a portion of the exhaust gas from said heat riser into said induction system,
 (b) means for injecting air into the exhaust gas passing through said exhaust outlets and into said exhaust manifold, and
 (c) means for substantially preventing said air injection into that exhaust gas which passes into said heat riser to thereby effectively prevent said injected air from commingling with that portion of said exhaust gas recycled into said induction system.

6. In an exhaust system for an internal combustion engine having combustion chambers and valved exhaust outlets leading therefrom into an exhaust manifold with exhaust gas from at least one of said outlets being passed through a heat riser, an induction system including a carburetor for feeding an air-fuel mixture to said combustion chambers, the improvement comprising, in combination:
 means for recycling exhaust gas from said heat riser into said induction system whereby said recycle exhaust gas is cooled by heat exchange with said air-fuel mixture flowing through said induction system, and
 a plurality of tubular means extending into said exhaust manifold proximate each said exhaust outlets except those outlets supplying gas to said heat riser, for injecting air into the exhaust gas passing through said exhaust outlets into said exhaust manifold.

7. In an exhaust system for an internal combustion engine having combustion chambers and valved exhaust outlets leading therefrom into an exhaust manifold, an induction system including a carburetor for feeding an air-fuel mixture to said combustion chambers, the improvement comprising, in combination:
 means for recycling a portion of the exhaust gas into said induction system, and
 a plurality of tubular means extending into said exhaust manifold proximate each said exhaust outlet except those outlets supplying gas recycled to said induction system, for injecting air into the exhaust gas passing through said exhaust outlets into said exhaust manifold.

8. In an exhaust system for an internal combustion engine having a plurality of combustion chambers and valved exhaust outlets leading therefrom into an exhaust system, an induction system including a carburetor for feeding an air-fuel mixture to said combustion chambers, the improvement comprising, in combination:
 (a) a plurality of conduits receiving exhaust gas from said exhaust system, said conduits terminating in said induction system thereby recycling exhaust gas into said air-fuel mixture entering said combustion chambers,
 (b) means for injecting air into the exhaust gas passing into said exhaust system, and
 (c) means for substantially preventing injection of air into said conduits recycling exhaust gas into said induction system to thereby effectively prevent said injected air from commingling with that portion of said exhaust gas recycled into said induction system through said conduits.

9. In an exhaust system for an internal combustion engine having combustion chambers and valved exhaust outlets leading therefrom into an exhaust manifold with the exhaust gas from at least one of said outlets passing through a heat riser, a carburetor having a throttle valve and an induction manifold connecting said carburetor to said combustion chambers, the improvement comprising, in combination:
 valved means for recycling exhaust gas from said heat riser into the air-fuel mixture in said induction manifold downstream from said carburetor,
 means for injecting air into the exhaust gas passing through said exhaust outlets and into said exhaust manifold, and
 means for substantially preventing said air injection into that exhaust gas which passes into said heat riser to thereby effectively prevent said injected air from commingling with that portion of said exhaust gas recycled into said induction manifold.

10. The apparatus of claim 9 wherein said valved recycle means are connected to said throttle valve for conjoint operation.

11. The apparatus of claim 9 wherein said valved recycle means are vacuum operated.

12. The apparatus of claim 9 wherein said recycle valve is controlled by said carburetor air flow vacuum.

13. The apparatus of claim 9 wherein said recycle valve is controlled by said carburetor venturi vacuum.

14. The apparatus of claim 9 including a vacuum operated diaphragm device for operating said exhaust recycle valve.

15. In an exhaust system for an internal combustion engine having a plurality of combustion chambers and valved exhaust outlets leading therefrom into an exhaust manifold with the exhaust gas from at least one of said outlets passing through a heat riser, an air-fuel mixer device having a throttle valve, and an induction manifold connecting said mixer device to said combustion chambers, the improvement comprising, in combination:
 a plurality of conduits receiving exhaust gas from said heat riser, said conduits terminating in said induction manifold thereby conveying exhaust gas into the air-fuel mixture entering said combustion chambers,
 valve means for controlling the flow of said exhaust gas into said conduits,
 means for injecting air into the exhaust gas passing through said exhaust outlets into said exhaust manifold, and
 means for substantially preventing the injection of air into that exhaust gas passing into said heat riser to thereby effectively prevent said injected air from commingling with that portion of said exhaust gas recycled into said induction manifold through said conduits.

16. In an exhaust system for an internal combustion engine having combustion chambers and valved exhaust outlets leading therefrom into an exhaust manifold with the exhaust gas from at least one of said outlets passing through a heat riser, a carburetor having a throttle valve actuated by an accelerator mechanism having idle position, part-throttle positions, and floorboard position thereon, and an induction manifold connecting said carburetor to said combustion chambers, the improvement comprising, in combination:

valved means for recycling exhaust gas from said heat riser into the air-fuel mixture in said induction manifold downstream from said carburetor, said valved means being in heat exchange relationship to said intake manifold whereby said recycle exhaust gas is cooled by heat exchange with the incoming air-fuel mixture flowing from said carburetor into said combustion chambers through said induction manifold, means for injecting air into the exhaust gas passing through said exhaust outlets into said exhaust manifold, means for substantially preventing the injection of air into that exhaust gas passing into said heat riser, to thereby effectively prevent said injected air from commingling with that portion of said exhaust gas recycled into said induction manifold, and means connected to said accelerator mechanism for controlling the flow of said recycle exhaust gas into said induction system whereby said recycle control means are substantially closed at said idle and floorboard positions and open for maximum recycle of said exhaust gas into said induction system at said part-throttle positions.

17. In an exhaust system for an internal combustion engine having two banks of combustion chambers with valved exhaust outlets leading therefrom into an exhaust manifold for each of said banks with the exhaust gas from at least one of said outlets being passed through a heat riser, a carburetor having a throttle valve, and an induction manifold connecting said carburetor to said combustion chambers, the improvement comprising in combination:

valved means for recycling exhaust gas from said heat riser into the air-fuel mixture in said induction manifold downstream from said carburetor, means for injecting air into the exhaust gas passing through said exhaust outlets into said exhaust manifold, means for substantially preventing the air injection into that portion of said gas passing into said heat riser to thereby effectively prevent said injected air from commingling with that portion of said exhaust gas recycled into said induction manifold, and means for maintaining both exhaust manifolds open to an exhaust pipe system.

18. In an exhaust system for an internal combustion engine having combustion chambers and valved exhaust outlets leading therefrom into an exhaust manifold with the exhaust gas from at least one of said outlets passing through a heat riser, a carburetor having a throttle valve, and an induction manifold connecting said carburetor to said combustion chambers, the improvement comprising, in combination:

valved means for recycling exhaust gas from said heat riser into the air-fuel mixture in said induction manifold downstream from said carburetor whereby said recycle exhaust gas is cooled by heat exchange with the incoming air-fuel mixture flowing from said carburetor into said combustion chamber through said induction manifold, tubular means for injecting air through said exhaust manifold into said exhaust gas passing through each of said exhaust outlets into said exhaust manifold, and means for plugging each tubular means extending through said exhaust manifold approximate said exhaust outlets supplying exhaust gas to said heat riser, to thereby effectively prevent said injected air from commingling with that portion of said exhaust gas recycled into said induction manifold.

19. In an exhaust system for an internal combustion engine having combustion chambers and valved exhaust outlets leading therefrom into an exhaust manifold with exhaust gas from at least one of said outlets being passed through a heat riser, a carburetor having a throttle valve, and an induction manifold connecting said carburetor to said combustion chambers, the improvement comprising, in combination:

valved means for recycling exhaust gas from said heat riser into the air-fuel mixture in said induction manifold downstream from said carburetor whereby said recycle exhaust gas is cooled by heat exchange with the incoming air-fuel mixture flowing from said carburetor to said combustion chamber through said induction manifold, and a plurality of tubular means extending into said exhaust manifold approximate each said exhaust outlets except those outlets supplying gas to said heat riser, for injecting air into the exhaust gas passing through said exhaust outlets into said exhaust manifold.

20. In an exhaust system for an internal combustion engine having combustion chambers and valved exhaust outlets leading therefrom into an exhaust manifold with the exhaust gas from at least one of said outlets being passed through a heat riser, an air-fuel mixer device having a throttle valve actuated by a foot pedal, and an induction manifold connecting said mixer device to said combustion chambers, the improvement comprising, in combination:

a conduit providing communication between said exhaust outlet from which exhaust gas is supplied to said heat riser and said induction manifold, valve means for controlling the flow of exhaust gas through said conduit, means for injecting air into the exhaust gas passing through said exhaust outlets into said manifold, means for substantially preventing the injection of air into the exhaust gas passing into said conduit to thereby effectively prevent said injected air from commingling with that portion of said exhaust gas recycled into said induction manifold, and means including a drive mechanism for connecting said throttle valve to said control valve means for conjoint operations, said drive mechanism being actuated by said foot pedal whereby floorboard position of said foot pedal closes said control valve means to the passage of recycle gas through said conduit.

21. In an exhaust system for an internal combustion engine having combustion chambers and valved exhaust outlets leading therefrom into an exhaust manifold with the exhaust gas from at least one of said outlets being passed through a heat riser, an air-fuel mixer device having a throttle valve actuated by an accelerator mechanism having idle position, part-throttle position, and floorboard position thereon, an induction system connecting said device to said combustion chambers, and a conduit providing communication between said heat riser and said induction system, the improvement comprising, in combination:

means connected to said throttle valve accelerator mechanism and said conduit for controlling the flow of said recycled exhaust gas into said induction system whereby said control means are substantially closed at idle and floorboard positions and open for maximum recycle of said exhaust gas into said induction system at said part-throttle positions, means for injecting air into said exhaust gas passing through said exhaust outlets into said exhaust manifold, and means for substantially preventing the injection of air into that exhaust gas passing into said heat riser and said conduit to thereby effectively prevent said injected air from commingling with that portion of said exhaust gas recycled into said induction system.

22. In an exhaust system for an internal combustion engine having combustion chambers and exhaust outlets leading therefrom into an exhaust manifold, an induction system including a carburetor for feeding an air-fuel mixture to said combustion chambers, the improvement comprising in combination:

(a) means for conveying a first stream of exhaust gas from said exhaust outlets into said exhaust manifold;
(b) means for recycling a second stream of exhaust gas from said exhaust outlets into said induction system; and
(c) means for injecting air into only said first stream of exhaust gas.

References Cited
UNITED STATES PATENTS

| | | | |
|---|---|---|---|
| 3,237,399 | 3/1966 | Hamblin et al. | 60—30 |
| 3,237,615 | 3/1966 | Daigh. | |
| 3,406,515 | 10/1968 | Behrens | 60—30 |
| 3,429,303 | 2/1969 | Roberts | 60—30 X |

AL LAWRENCE SMITH, Primary Examiner

U.S. Cl. X.R.

60—30; 123—122